United States Patent [19]

Joest, III et al.

[11] 4,334,792
[45] Jun. 15, 1982

[54] DESTINATION-REFERENCED TAB, OPERATIONS FOR TYPEWRITERS THAT STORE TEXT

[75] Inventors: William F. Joest, III; William R. McCray; Edward V. Rutkowski, Jr., all of Lexington, Ky.

[73] Assignee: International Business Machines Corporation, Armonk, N.Y.

[21] Appl. No.: 79,627

[22] Filed: Sep. 27, 1979

[51] Int. Cl.³ .............................................. B41J 25/18
[52] U.S. Cl. .................................... 400/279; 400/63; 400/70; 364/900
[58] Field of Search ................... 400/7.63, 64, 76, 252, 400/279, 281, 697.1; 364/900

[56] References Cited

U.S. PATENT DOCUMENTS

| | | | |
|---|---|---|---|
| 3,403,386 | 9/1968 | Perkins et al. | 400/63 X |
| 3,613,083 | 10/1971 | DeSandre | 364/900 |
| 3,749,223 | 7/1973 | Guzak, Jr. | 400/279 |
| 3,814,011 | 6/1974 | Kashio | 400/279 X |
| 3,832,697 | 8/1974 | Kashio | 400/279 X |
| 4,004,675 | 1/1977 | Ludwig | 400/281 |
| 4,031,996 | 6/1977 | Busch | 400/279 |
| 4,086,660 | 4/1978 | McBride | 364/900 |
| 4,131,949 | 12/1978 | Fletcher et al. | 400/64 X |

Primary Examiner—Ernest T. Wright, Jr.
Attorney, Agent, or Firm—George E. Grosser

[57] ABSTRACT

Tab codes produced at a typewriter keyboard are converted to a form for text storage that includes travel distance and destination information. By using a multiple section code with distinct tab code identifier bytes on either end, the overall tab code can be embedded with normal single byte character codes in a text string and processed specially during forward or reverse operations with storage. For forward operation on a text string, coded destination information is extracted from a preselected byte of the multisection code, upon detecting the tab identifier, and special logic, first extracts the destination information, and then automatically passes over the remainder of the code to arrive at the next code of the text string. By so indicating the tab destination in the tab code, a tab operation is enabled to be independent of the active tab settings at the time of playback. Accordingly, the operator need not be concerned with resetting the tabs to their original condition when at a later time a document is printed from storage. And, by providing travel distance information, it is possible to back over or erase a tab operation without loss of correspondence between the print position and the reference point in the stored text string.

8 Claims, 9 Drawing Figures

DESTINATION-REFERENCED TAB, OPERATIONS FOR TYPEWRITERS THAT STORE TEXT

BACKGROUND OF THE INVENTION

1. Field of the Invention

The present invention relates to code conversion logic for a typewriter that produces a special tab code when a tab operation is keyboarded as a part of a text string that is being stored for subsequent playback.

2. Discussion Relative to the Art

Tabs are generally set by sequentially positioning the print point of a typewriter to a series of tab locations and at each location depressing the tab set key, thereby causing the respective tab locations to be stored in either a mechanical or an electronic storage. For playback of stored text strings, the tab code has typically caused the typewriter to perform as if the code was presently generated at the keyboard and the presently active tab settings are used. If the operator wishes to use the settings that were active when a document was originally keyboarded, as is usually the case, those settings must typically be restored by the operator prior to playback.

To avoid this inconvenience, provision has been made in some typewriters for storing the tab settings in a special data grouping preceding a stored text string. This approach has problems, however, if changes to the tab settings occur within the document as may be desireable when laying out a business form.

To permit greater flexibility, some typing systems associated with computer terminals permit a new set of tabs to be defined by inserting a tab set command in a text string.

A further approach to recording tab operations involves the conversion of the tab code to a corresponding series of space codes. With such an approach, however, additions or deletions that occur on a line ahead of a tab operation will shift the destination point of the tab operation a result that is generally not desired.

In typewriters that provide for automatic backspace/erase it is known to include in a text string a code to indicate the start point for a tab operation, such code being followed by a tab code. The start point information makes it possible to erase text in front of a tab without any need to reestablish correspondence between the reference point in storage and the print position. In this regard, it should be noted that on some typewriters, it is necessary to come forward from the beginning of the line to erase to the left of a tab on that line if correspondence is to be maintained between the print point and the reference point in storage.

For work with business forms, in particular, where tab settings may change a number of times for a single form, a more convenient approach for defining an operative set of tab positions would be desirable.

SUMMARY OF THE INVENTION

Tab codes produced at the keyboard of a text processing apparatus having text storage capability are automatically converted, for storage as part of a text string, to a multiple section code that indicates a destination printing position and the shift in printing position that occurs. The multi-section code preferrably includes leading and trailing identifier sections, one byte in length, that serve to trigger special decoding logic upon playback. When printing from storage, the destination section of the tab code is accessed and the print point is shifted forward to the represented destination location regardless of present tab settings and any change that might have occurred in the tab start point as a result of editing. For an indent tab, the old left margin position is preferably stored in a further added section of the tab code that is stored.

If a backspace/erase operation involves a tab code, the destination and shift increment are decreased by one unit for each key depression permitting incremental leftward tab destination movement for editing purposes. When the print point is moved to the tab start point, the entire tab code is erased from storage, including the identifier sections.

By so controlling tab storage and tab responses, playback and editing of a stored tab is related to a particular stored code embedded in the text string and subsequent changes to that stored tab do not change other stored tabs (as a change to a tab setting would for a system based on present tab settings) nor does editing before that code affect the destination to which the printer is driven by the tab code. In contrast, it should be appreciated that with the prior art technique of embedding control signals that change tab settings, any editing that changes a tab setting impacts subsequent tab operations. Playback using space codes to represent tab operation, on the other hand, is isolated in effect but a generally undesirable shift results in the tab destination point if the start point for the tab operation is subsequently shifted as a result of editing.

BRIEF DESCRIPTION OF THE DRAWING

A presently preferred implementation of the invention will now be described in detail with reference to the drawing wherein.

DETAILED DESCRIPTION OF A PRESENTLY PREFERRED IMPLEMENTATION

Figure 1:
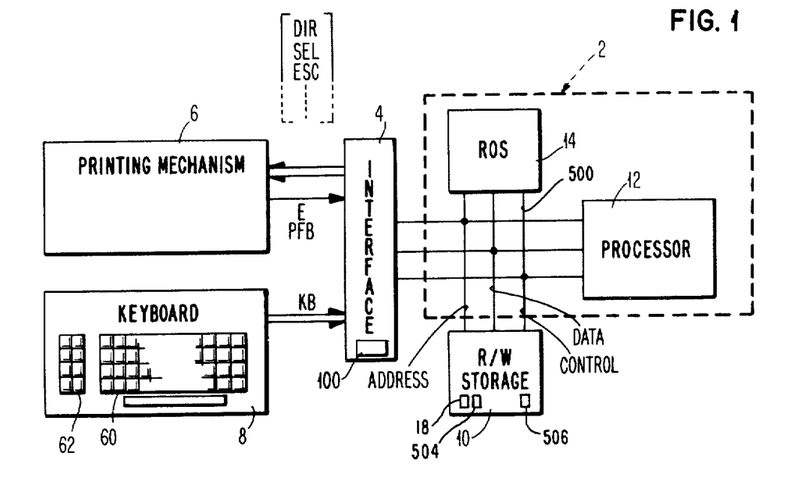
FIG. 1 is a diagram in block form indicating various instrumentalities of a typewriter suitable for implementation of the invention.

Referring to FIG. 1, a text storage typewriter suitable for use according to the invention includes an operation-controlling logic device 2 which is coupled through an interface 4 to printing apparatus 6 and keyboard apparatus 8. Accessible storage for text and other information is provided by a read/write storage device 10 that cooperates with the logic device 2. Text storage is indicated as a set of storage locations 18. Preferably, logic device 2 comprises a sequential logic processor 12 that cooperates with a read-only-storage (ROS) 14 which embodies in coded form a set of predefined signal handling responses for the processor 12. The ROS 14 also holds fixed data used, for example, in calculations. Such a signal processing arrangement is well known in the art and is employed, for example, in IBM Electronic Typewriter Models 50 and 60.

With such an arrangement, the signal responses are, for the most part, defined by structure of the ROS 14 using various basic operations of processor 12 as building blocks. Part of the overall response characteristic is typically built into the interface 4 and the degree of pre- and post-processing of signals that occurs there is typically selected in view of cost, performance and timing considerations. It should be appreciated, however, that essentially similar response characteristics may be achieved using direct wired logic according to techniques known in the art. The processor approach merely involves a time-sharing of hardware building blocks as compared to the permanent identification of logic devices to respective branches of a fixed logic system.

Figure 2:
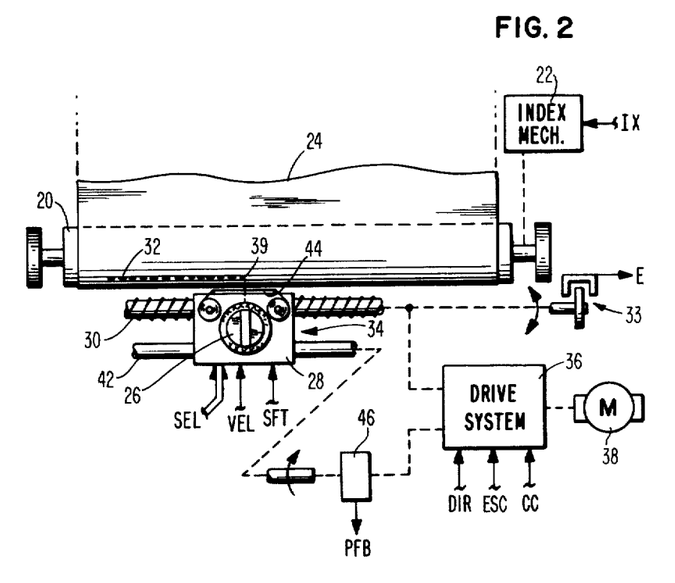
FIG. 2 is a simplified partial plan view of a printer suitable for implementation of the invention.

Printing apparatus 6 may take various known forms and, may, for example, be a conventional single element impact printer or a typebar printer or even a matrix printer such as an ink jet printer. Referring to FIG. 2, a presently preferred kind of printing apparatus 6 to cooperate in an implementation of the invention includes paper feed means such as a platen 20 (and associated feed rollers not shown).

The platen 20 is coupled to an indexing device 22 that responds to a signal IX to cause incremental rotation for advancing an inserted medium such as a sheet of paper 24 along a feed path.

A character forming element 26 is mounted on a support 28 that cooperates with linear drive apparatus such as a lead screw 30 to be moveable parallel to the platen 20 for defining a line 32 for printing. Position along the line 32 is indicated by a signal E produced by a motion detector 33 that is coupled to the lead screw 30.

The element 26 and support 28 taken together comprise a carrier 34 which is controllably positioned along the line 32 by a drive system 36 that responds to control and direction signals ESC and DIR, respectively, in transmitting motion from a motor 38 to the lead screw 30. Actual printing at a present printing position 39 is effected using selection and impacting means (not shown) that cooperate with element 26 and respond to selection and velocity signals indicated as SEL and VEL, respectively. An upper case/lower case shift operation is also provided in response to a signal SFT.

Power for printing is supplied by a print shaft 42 that is rotated by the drive system 36 in response to a signal CC. A cam and follower system (not shown) transfers motion for selection and impacting of element 26. A ribbon carrier and associated drive device (not shown) hold a ribbon 44 between the element 26 and the platen 20 for making an ink impression on the paper 24. A detector 46 that cooperates with print shaft 42 serves to indicate when a print cycle is completed by means of a printer feedback signal PFB.

The various signals mentioned above regarding the printing apparatus 6 are preferably routed through the interface 4 (see FIG. 1).

The above-described kind of printing apparatus 6 is well known in the art and, as was mentioned above, is described as environment for the invention. Such a printing apparatus 6 is exemplified in the IBM Electronic Typewriter Models 50 and 60. A more detailed description of such a printing apparatus 6 is provided in the IBM Electronic Typewriter Service Manual.

Figure 4:
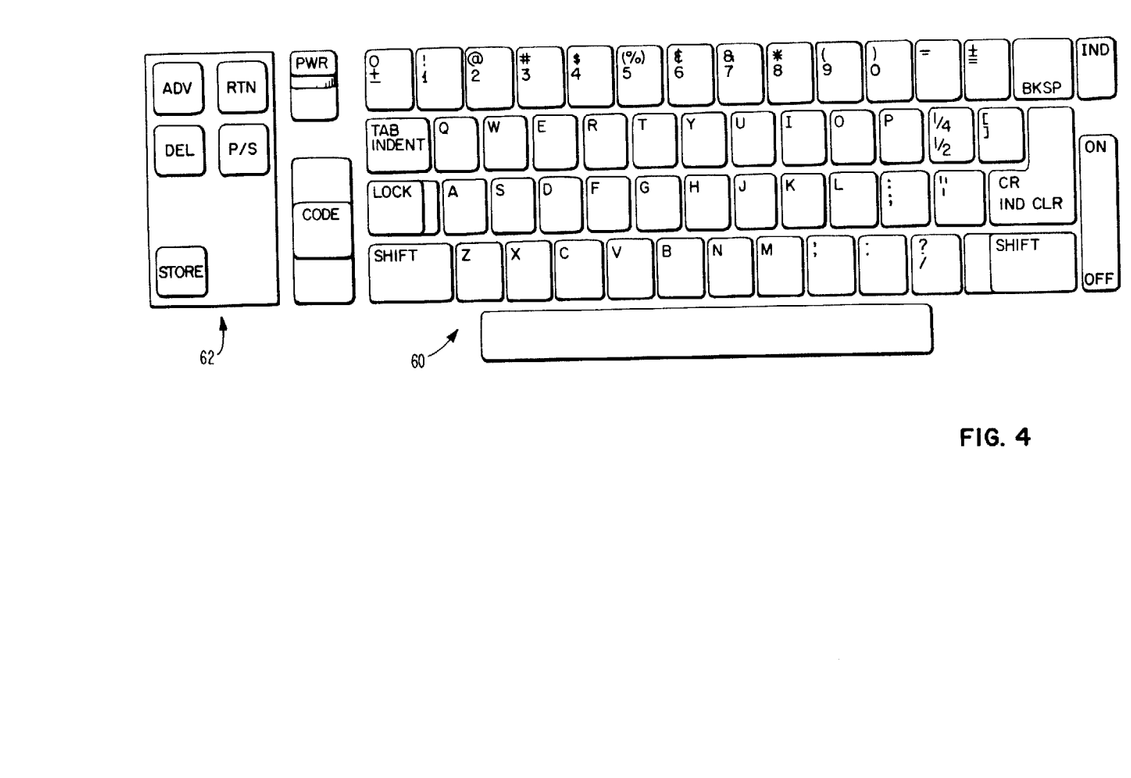
FIG. 4 is a simplified plan view of a keyboard.

Referring to FIGS. 1 and 4, the keyboard apparatus 8 serves as an input device for an operator and produces coded signals KB responsive to depressions of individual keys or selected combinations thereof.

Included among the keys for a main keyboard 60 are alphabetic keys, numeric keys, punctuation keys, a tab key, a carrier return key, a hyphen key, and a spacebar.

An auxiliary keyboard area 62 preferably includes ADVANCE, DELETE, RETURN, PLAY/STOP (P/S), and STORE keys which initiate modes for recording, playback and editing of text strings. Various stored codes for the presently preferred implementation are indicated in part in Table 1. It will be appreciated, however, that various coding plans are possible.

TABLE 1

| STORED CODE IN HEXADECIMAL | PRINTING OPERATION REPRESENTED |
|---|---|
| 00 | Null |
| 06 | Space |
| 08 | Index |
| 0C | Discretionary Carrier Return |
| 0D | Required Carrier Return |
| 10–6F | Graphics |
| 70 | Syllable Hyphen |
| 86 | Coded Space |
| 8E | Backspace |
| 9A | Word Double Underscore |
| 9B | Multiple Word Double Underscore |
| 9C | Stop Code |
| C2 | Coded Hyphen |
| D6 | Word Underscore |
| D7 | Multiple Word Underscore |
| EE | Continuous Underscore |
| F0 | Tab |
| F1 | "Negative" Tab |
| F2 | Indent Tab |
| F3 | "Negative" Indent Tab |
| F4 | Multiple Backspace |
| F6 | Indent Clear |
| FF | Separator, separates phrases in the text |
| 42 | Normal Hyphen |

Certain stored codes are converted from the code produced by the keyboard apparatus 8 and certain keyboard codes of particular interest are indicated in Table 2.

TABLE 2

| CODE (HEXADECIMAL) | OPERATION REPRESENTED |
|---|---|
| 42 | Normal Hyphen |
| 04–05 | Tab |
| 0C–0D | Carrier Return |
| 8C–8D | Indent Clear |

The monitoring of printer position is important to the invention and, accordingly, a brief discussion of known techniques for determining the present printing position will be provided.

It is possible to directly detect printing position using position encoders and such encoders are known which produce either digital or analog output signals. For typewriters, however, it is more usual to provide a detector which indicates increments of motion, for example, using a disc having radial metering marks and cooperates with a photodetector (indicated in simplified form as detector 33, FIG. 3) to indicate position shifts.

With such an approach, the processor 12 (see FIG. 1) maintains a count (PPOS) in a specific storage location 504 of the read/write storage device 10 that is indicative of the present printing position. Using a presently preferred technique for maintaining the stored count (PPOS) indicative of a present printing position, the processor 12 determines the total change to the position count PPOS corresponding to a commanded operation, e.g., printing of a character, and updates the position count PPOS without regard to printer operation. The count change, however, is written into a counter 50 (FIG. 3) of interface 4 using a decoder 52 which responds to an address code assigned to direction and position increment data. The counter 50 and the decoder 52 then send commands ESC and DIR to the drive system 36 of printing apparatus 6 until the count total is reduced to zero by the feedback pulses E from detector 33. This type of print position monitoring and control is similar to that used in the IBM Electronic Typewriter Model 50.

Figure 3:
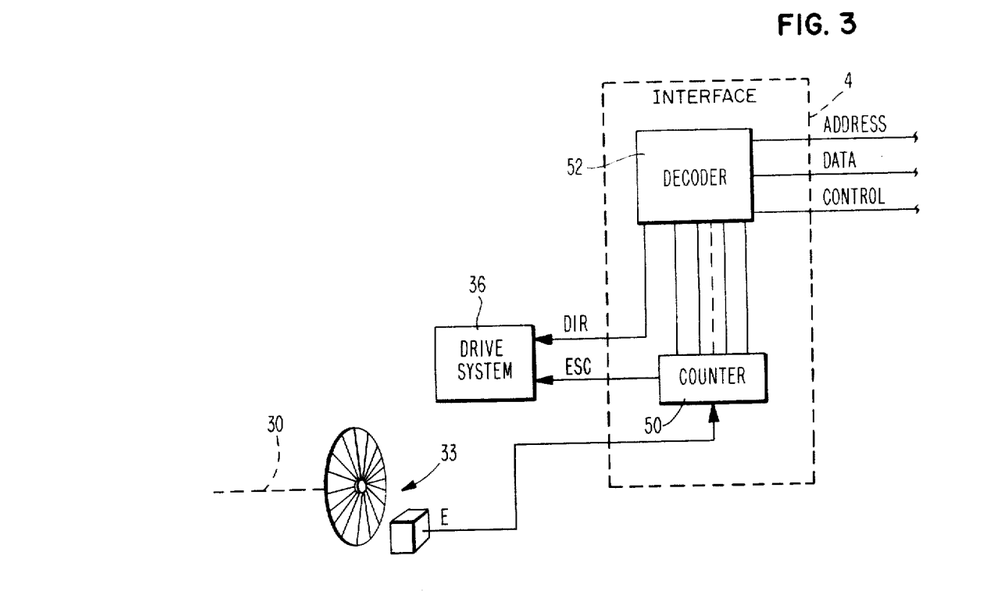
FIG. 3 is a diagram mainly in block form for indicating apparatus for controlling the shifting of a print point for printing apparatus.

Right and left margin positions for such printers are identified by coded position numbers which are referenced to increments for the detector 33 (FIGS. 1 and 3). Typically, the position numbers are stored at dedicated locations in the read/write storage device 10 and are selectable by the operator at the keyboard apparatus 8. The IBM Model 50 and 60 Electronic typewriters, for example, provide for such selection of right and left margin positions.

Figure 5:
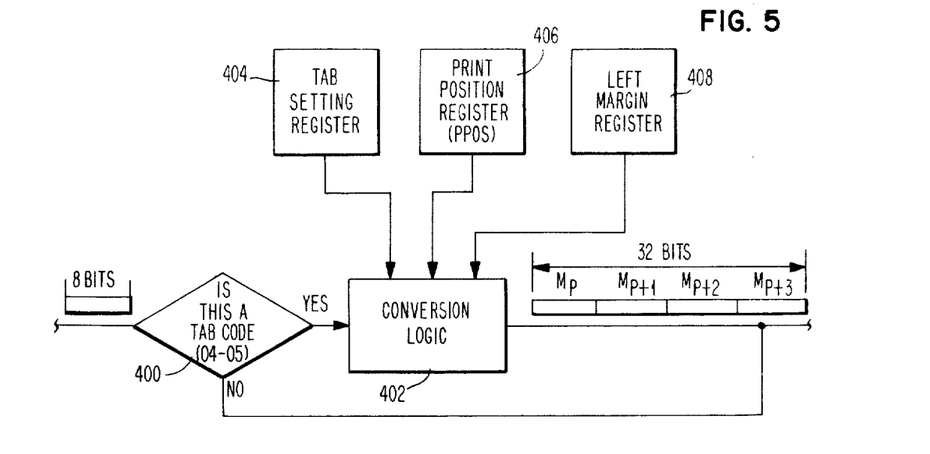
FIG. 5 is a simplified block diagram indicating operation of a preferred implementation of the invention.
Figure 6:
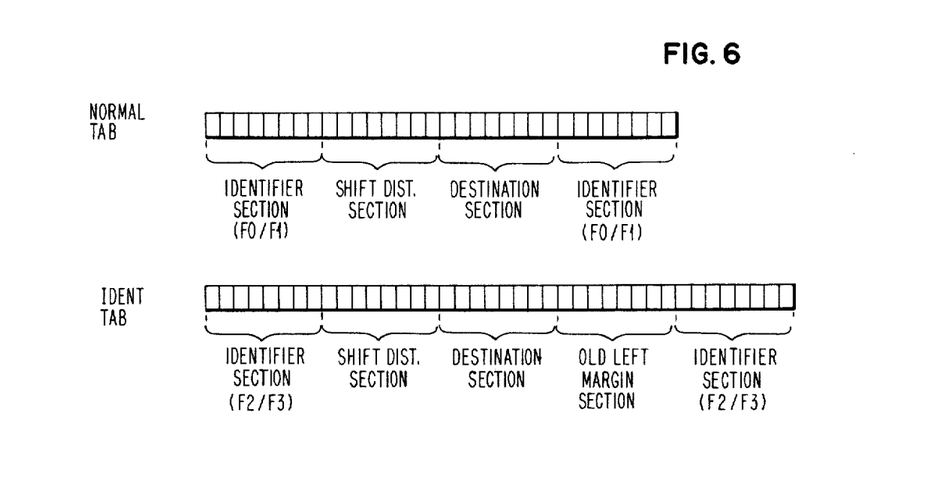
FIG. 6 is a diagram indicating multisection tab codes according to the invention for normal and indent tab operation.

A preferred approach to implementing the invention is indicated in FIG. 5. A keyboard tab code (e.g. 04 or 05) is detected (block 400) in a text string and information regarding the print point shift distance and destination is determined by comparing a stored count code (PPOS) representative of print position and tab setting information (stored in registers 404 and 406) as is well known for electronic typewriters. For the indent tab, it is preferred to also access left margin information (block 408). Conversion logic 402, such as that described in the detailed implementation description below then produces a multisection tab code stored in a succession (denoted $M_p - M_{p+3}$) of text storage locations of the read/write storage 10, that permits the tab operation on playback to use the tab settings that are in effect at the time of keyboarding. Preferred code formats for normal tab and indent tab are indicated in FIG. 6. Identifier sections (e.g. including the code F0 for normal tabs and F2 for indent tabs) on either end of the tab codes serve to trigger special playback logic (see logic 109 discussed below) for the positioning information contained in the codes. Preferably the tab destinations are referenced to the active left margin and distinct identifier codes are used for tabs to the left of the left margin (e.g. F1 for normal tabs and F3 for indent tabs).

Figure 7:
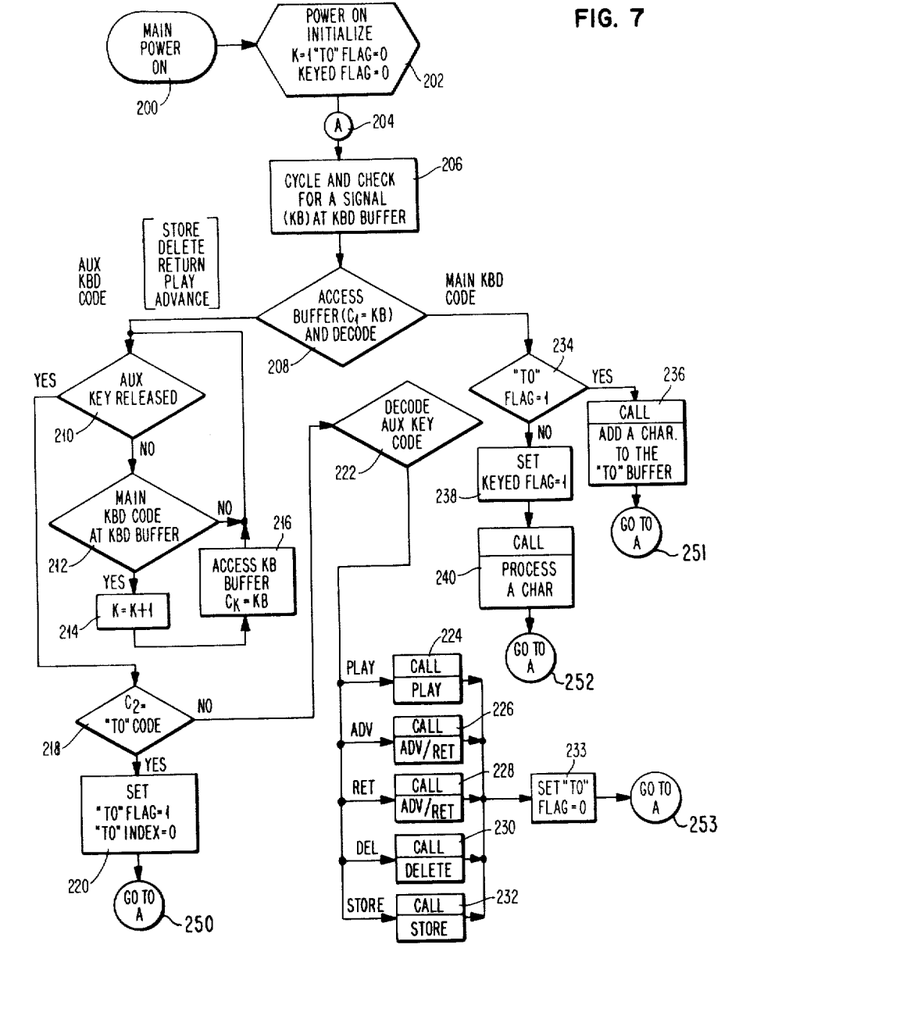
FIG. 7 is a flow chart indicating the main logic organization for the presently preferred implementation.
Figure 8:
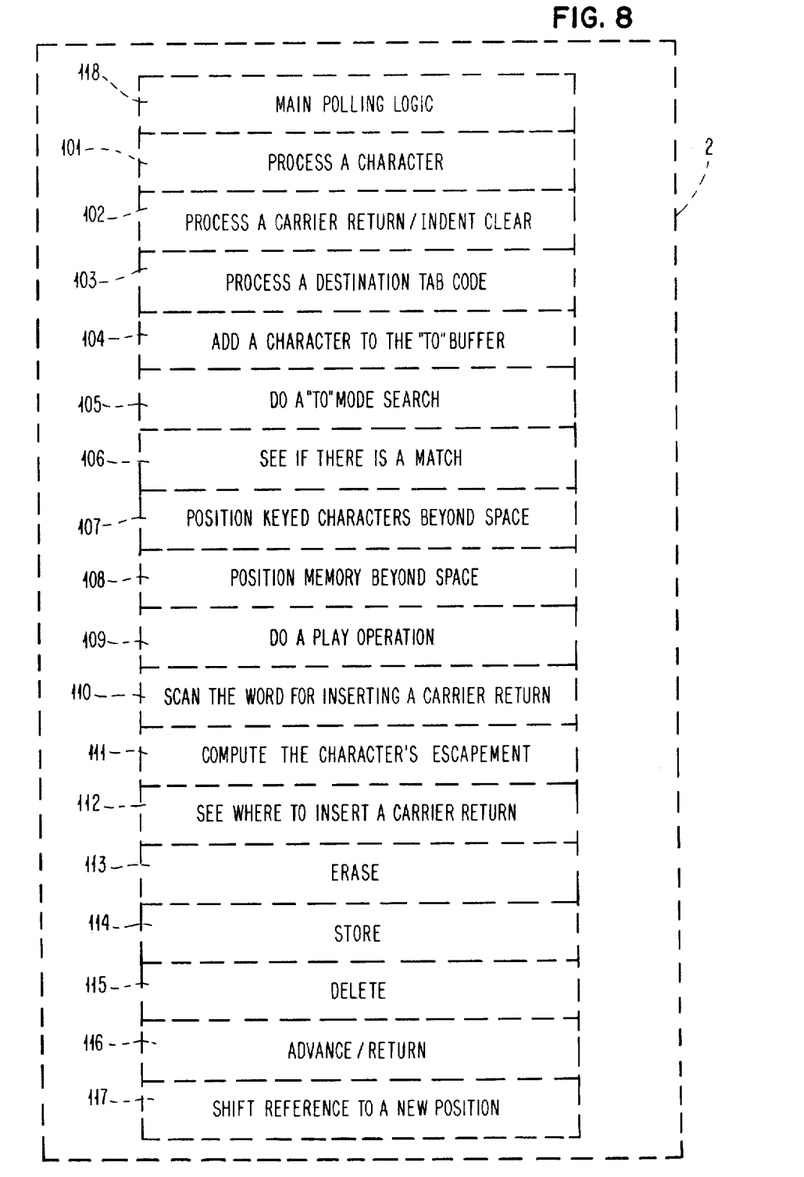
FIG. 8 is a block diagram indicating logic partitioned by subroutine organization.

Referring to FIG. 8, the signal processing structured into the logic device 2 is represented according to partitioning by subroutine organization to include partitioned logic 101-118 which is described below in detail with reference to Logic Tables 1-17 and FIG. 7, respectively.

Referring to FIG. 7, the main polling logic 118 that is incorporated in the structure of logic device 2 is indicated diagrammatically. Such logic structure serves to coordinate the processing of signals KB that arrive at a keyboard buffer 100 of interface 4.

When the machine power is switched on (Block 200), an initialization of flags and index values occurs (Block 202). After an entry point A (Block 204), a repeated check is maintained for a signal at the keyboard buffer 100 (Block 206). Upon detecting a signal at buffer 100, e.g. using an accessed flag at a preselected interface register or an interrupt signal on the control bus 500, the keyboard buffer 100 is accessed and the keyboard signal (KB) is stored in a stored variable denoted $C_1$ and is decoded (Block 208).

An initial distinction is made between codes from the auxiliary keyboard 62 (which preferably control operations with text storage) and codes from the main keyboard 60. The auxiliary keyboard selections are preferably indicated by single bit codes, whereas the main keyboard 60 preferably represents selections as eight bit codes. For auxiliary keyboard codes, it is further determined whether a main keyboard key is depressed while the auxiliary keyboard key remains depressed. If so, the index K is incremented and the code is stored as $C_K$ (Blocks 210-216).

Once the auxiliary keyboard key is released, a check is made to determine if a content-addressed search (the "TO" mode) has been selected (Block 218) in which case a "TO" flag and a "TO" index for use in the search operations are set (Block 220). If a search is not selected, a branch to appropriate logic for the selected mode (PLAY, ADVANCE, RETURN, DELETE or STORE) is effected (Blocks 222-232). Upon returning from one of the mode operations (Blocks 222-232), the TO FLAG is reset (Block 233).

If a main keyboard code is detected for the signal processing described at Block 208, the "TO" flag is checked (Block 234) to determine if a search address is being keyboarded. If so, a branch operation is effected to logic 104 for adding codes to the search address buffer 506 (see FIG. 1) which is labeled as the "TO" buffer (Block 236). Such buffer 506 is preferably a series of locations of the storage device 10 (FIG. 1) and the logic 104 for storage of a text address is described more fully below.

For the situation where, for the test at Block 234, a search address is not being keyboarded ("TO" flag = 0), a flag (denoted "Keyed Flag") indicating the occurrence of a keyed character is set to a preselected state (Block 238) and a branch operation (Block 240) to logic 101 for processing a character (described below) is initiated. Various transfers of logic flow back to the entry point A (Block 204) have been indicated by the "GO TO A" instruction (Blocks 250-253). Descriptions of the blocks of logic entered by branching from the main polling loop (FIG. 7) are provided below in terms of a structured programming language. It is assumed that storage locations 18 for stored text string codes (denoted M) are sequential and that a storage section having empty storage has been created at the reference point to permit code additions and deletions without constant shifting of trailing codes. Pointers p and r indicate the beginning and end of the empty section. New code is added at entry location Mp and during playback from the read/write storage 10, a code progresses from the location $M_r$ to $M_p$ as it is played and pointers r and p are incremented for the next code.

Referring to Logic Table 1, the logic 101 that is called from block 240 (FIG. 7) is described in structured programming language. Section 1 performs tests based on the beginning of the return zone (e.g. right margin count—count for 5 character positions) and the nature of the present and preceding code are checked in order to determine if a carrier return should be inserted to establish a line end point. If so, a transfer occurs to carrier return logic 102 described below.

Section 2 detects hyphen codes and sets flags to indicate whether or not the hyphen is keyed by operator. At Section 3, a flag is set and a transfer to special carrier return logic 102 occurs if the code being processed is a carrier return code. Tab and indent tab codes ($04_{16}$ and $05_{16}$) are detected by code responsive logic of Section 4 and the tab destination identified from position representative codes stored in the register 404 is stored in a location associated with the variable "TAB DESTINATION". The variable TAB DESTINATION is adjusted to be measured relative to the left margin at Sections 4a and 4b. The tab code itself is converted to a destination tab identifier at Sections 4a and 4b, which identifier codes correspond to either a positive destination tab ($F0_{16}$), a positive indent tab ($F2_{16}$), a negative destination tab ($F1_{16}$) or a negative indent tab ($F3_{16}$). (The subscript "16" is used to indicate numbers to the base sixteen.)

At Section 5, a transfer is initiated responsive to detection of one of the destination tab codes ($F0_{16}$–$F3_{16}$) to logic for processing a destination tab code (described below). A test for an erase code is provided in Section 6 and a transfer to erase logic 113 (described below) occurs if an erase code is presented. The processing of an indent clear code is treated in Section 7. For Section 8, all codes requiring individualized processing have been identified at Sections 1-7 and normal character processing may occur. The position of the last graphic printed $E_1$ is updated if appropriate for use with the carrier return insertion logic 112 (Logic Table 12).

LOGIC TABLE 1

| | Process a Character |
|---|---|
| Sec 1 | IF PPOS > (RT margin − 5) and $C_1$ = graphic and $M_p$ = space code or hyphen code<br>THEN set the INSERTED CARRIER RETURN FLAG = 1<br>CALL (Process a Carrier Return/Indent Clear)<br>ENDIF |
| Sec 2 | IF $C_1$ = hyphen code<br>THEN IF the KEYED FLAG = 1<br>THEN set the HYPHEN KEYED FLAG TO 1<br>ELSE set the HYPHEN KEYED FLAG TO 0<br>ENDIF<br>Send print hyphen command to interface 4<br>Set $E_1$ = PPOS<br>IF the STORE FLAG = 1<br>THEN set $M_p$ = regular hyphen code<br>ENDIF |
| Sec 3 | ELSE IF $C_1$ = carrier return code<br>THEN set the INSERTED CARRIER RETURN flag to 0<br>CALL (Process a Carrier Return) |
| Sec 4 | ELSE IF $C_1$ = keyboard tab code or a keyboard indent tab code<br>THEN Search active tab storage for first entry greater than PPOS<br>and store in TAB DESTINATION |
| Sec 4a | IF the location is at or beyond the left margin (LM)<br>THEN set TAB DESTINATION = TAB DESTINATION − LM<br>set $C_1$ = positive tab code (F0) (F2 if indent) |
| Sec 4b | ELSE set TAB DESTINATION = LEFT MARGIN − TAB DESTINATION<br>SET $C_1$ = negative tab code (F1) (F3 if indent)<br>ENDIF<br>ENDIF |
| Sec 5 | IF $C_1$ = destination tab code (F0 to F3)<br>THEN CALL (Process a Destination Tab Code) |
| Sec 6 | ELSE IF C = erase code (OE or OF)<br>THEN CALL (Erase) |

LOGIC TABLE 1-continued

| | Process a Character |
|---|---|
| Sec 7 | ELSE IF $C_1$ = Keyboard Indent Clear Code (8C or 8D)<br>THEN set $C_1$ = Stored indent clear code (F6)<br>ENDIF<br>IF $C_1$ = Stored indent clear code (F6)<br>THEN CALL (Process a Carrier Return/Indent Clear) |
| Sec 8 | ELSE process code normally<br>IF $C_1$ = graphic code<br>THEN set $E_1$ = PPOS<br>ENDIF<br>ENDIF<br>ENDIF<br>ENDIF<br>ENDIF<br>ENDIF<br>RETURN |

Referring to Logic Table 2, carrier return processing logic 102 at Section 1 tests to determine if the carrier return was automatically inserted. If so, control skips to Section 4 and the carrier return is processed. If not, a temporary index m is set up for the present reference location.

In Section 2, a test is made for an underscore code and the temporary reference is shifted behind any such codes.

Section 3 tests for a normal hyphen code ($42_{16}$) and backs over any preceding multiple word underscore codes at Section 3a. Section 3b includes a logic test relating to the position and context of the hyphen to determine if it is to be converted to a syllable hyphen (coded as $70_{16}$). If the preceding character is a graphic code other than the hyphen code and the hyphen was keyed then it is determined whether the carrier return was keyed (as determined from the state of the flag variables (HYPHEN KEYED FLAG and KEYED FLAG). If these tests are satisfied and the hyphen printed beyond the start of the return zone (PPOS > Rt Margin-5), then the hyphen code is converted. Section 4 resets the left margin for an indent clear operation. Section 5 commands the carrier return operation and sets the indicators $E_1$ and $E_3$ to revised end of last word on line and end of last line positions, respectively.

LOGIC TABLE 2

| | Process a Carrier Return/Indent Clear |
|---|---|
| Sec 1 | IF $C_1$ = carrier return code (OC or OD)<br>THEN IF the INSERTED CARRIER RETURN FLAG = 0<br>THEN set m = p |
| Sec 2 | WHILE $M_m$ = word underscore code or multiple word underscore code<br>DO<br>set m = m − 1<br>ENDWHILE |
| Sec 3 | IF $M_m$ = hyphen code<br>THEN set n = m − 1 |
| Sec 3a | WHILE $M_n$ = multiple word underscore code<br>DO<br>set n = n − 1<br>ENDWHILE |
| Sec 3b | IF $M_n$ = word underscore code or graphic code other than the hyphen code AND<br>the KEYED HYPHEN FLAG = 1 AND<br>a character has printed beyond RT margin − 5 AND<br>the KEYED flag = 1<br>THEN set $M_m$ = syllable hyphen code<br>ENDIF<br>ENDIF |

LOGIC TABLE 2-continued

| | Process a Carrier Return/Indent Clear |
|---|---|
| | Set $M_p$ = carrier return code |
| Sec 4 | ELSE set $M_p$ = $C_1$ (F6) |
| . | set p = p + 1 |
| . | set $M_p$ = ACTIVE LEFT MARGIN |
| . | set p = p + 1 |
| . | set $M_p$ = $C_1$ |
| . | set ACTIVE LEFT MARGIN = |
| . | PERMANENT LEFT MARGIN |
| . | ENDIF |
| Sec 5 | set $E_3$ = $E_1$ |
| . | set DELTA = PPOS — ACTIVE LEFT MARGIN |
| . | send DELTA positioning data to |
| . | decoder 52 (FIG. 3) |
| . | Set $E_1$ = 0 |
| . | RETURN |

Referring to Logic Table 3, the process a destination tab code logic 103 referenced in Section 5 of Logic Table 1 begins at Section 1 by relating the absolute destination to the left margin. Section 2 sets up the travel distance for the tab in the variable TAB SPACE COUNT and Section 3 signals an error if such distance is negative. In Section 3a, a shift distance count and a direction are sent to the decoder 52 of interface 4. If the count for the tabs is in character positions, such count must be scaled to correspond to pulses E of detector 33 (FIG. 3).

In Section 4, index p is incremented to identify or point to successive storage entry locations that receive tab destination and shift distance codes (see FIG. 6) to produce a multisection tab code in read/write storage 10. For an indent tab code ($F2_{16}$ or $F3_{16}$) the value for the current left margin is also stored in the multi-section code at Section 4a (see FIG. 6). The margin is changed to the new margin value at Section 4b. The trailing identifier code is added to the multisection code at Section 5 at a storage location identified by the pointing index P.

LOGIC TABLE 3

| | Process a Destination Tab Code |
|---|---|
| Sec 1 | IF $C_1$ is a positive tab code (F0 or F2) |
| . | THEN compute ABSOLUTE DESTINATION = |
| . | LEFT MARGIN + TAB DESTINATION |
| Sec 1a | ELSE compute ABSOLUTE DESTINATION = |
| . | LEFT MARGIN — TAB DESTINATION |
| . | ENDIF |
| Sec 2 | set TAB SPACE COUNT = |
| . | ABSOLUTE DESTINATION — PPOS |
| Sec 3 | IF TAB SPACE COUNT 50 |
| . | THEN set TAB SPACE COUNT = 0 |
| . | signal interface 4 to cause a thump (no motion) |
| Sec 3a | ELSE send the tab space count to the decoder 52 |
| . | Interface 4 and set PPOS = |
| . | ABSOLUTE DESTINATION |
| . | ENDIF |
| Sec 4 | set p = p + 1 |
| . | set $M_p$ = $C_1$ (which has a value F0, F1, F2 or F3) |
| . | set p = p + 1 |
| . | set $M_p$ = TAB SPACE COUNT |
| . | set p = p + 1 |
| . | set $M_p$ = TAB DESTINATION |
| . | set p = p + 1 |
| Sec 4a | IF $C_1$ = F2 or F3 |
| . | THEN set $M_p$ = ACTIVE LEFT MARGIN |
| . | set p = p + 1 |
| . | ENDIF |
| Sec 4b | IF $M_p$ = F2 or F3 |
| . | THEN set ACTIVE LEFT MARGIN = PPOS |
| . | ENDIF |
| Sec 5 | Set $M_p$ = $C_1$ |
| . | RETURN |

Logic Table 4 describes logic 104 for adding a character to the address for a content-addressed search (TO) operation. At Section 1, an erase code triggers a decrementing of the search address index (i) to remove a character from the stored address ($T_i$), and indicates when the operation is completed, for example, by causing an operator perceivable vibration (thump) by oscillating the support 28 using the drive system 36. A case shift request is processed at Section 2 and Section 3 defines the maximum length for the address text string. Section 4 coordinates the processing of codes representing a graphic.

In particular, Section 4a equates the coded hyphen and the regular hyphen to the regular hyphen code for search comparison purposes. Then section 4b increments the index i and stores the code using the identifier $T_i$. Section 4c equates all of the codes causing a print position shift to a single space code for purposes of comparison for a content-addressed search. Section 5 causes a code that does not represent a valid search address entry to be ignored.

LOGIC TABLE 4

| | Add a Character to the To Buffer |
|---|---|
| Sec 1 | IF $C_1$ = erase code |
| . | THEN IF i ≠ 0 |
| . | THEN set i = i − 1 |
| . | thump |
| . | ENDIF |
| Sec 2 | ELSE IF $C_1$ = SHIFT |
| . | THEN send a command to the interface 4 to |
| . | shift the printer case (upper or lower) |
| Sec 3 | ELSE IF i = MAX (the maximum length text |
| . | address permitted) |
| . | THEN ignore $C_1$ (no entry in storage occurs) |
| Sec 4 | ELSE IF $C_1$ = a graphic code |
| Sec 4a | THEN IF $C_1$ = coded hyphen code |
| . | THEN set $C_1$ = regular hyphen code |
| . | ENDIF |
| Sec 4b | set i = i + 1 |
| . | set $T_i$ = $C_1$ |
| . | thump |
| Sec 4c | ELSE IF $C_1$ = space code, |
| . | coded space code, |
| . | tab code, |
| . | coded tab code, |
| . | THEN set i = i +1 |
| . | set $T_i$ = space code |
| . | thump |
| Sec 5 | ELSE ignore $C_1$ (no entry in |
| . | storage occurs) |
| . | ENDIF |
| . | ENDIF |
| . | ENDIF |
| . | ENDIF |
| . | ENDIF |
| . | RETURN |

Logic 105 for performing a content-addressed search is described in Logic Table 5. At Section 1, an index t is initialized with the length of the search address and condition indicating variables (flags) are initialized.

Sections 2–2f comprise a loop for comparing line beginnings with the stored address. At Section 2a, it is determined if the search is to be toward the leading end of the text string (RETURN mode) and if so, the index i and the indexing direction control variable (j) are initialized accordingly. The index i and direction control variable (j) are initialized for a search toward the trailing end of a text string at Section 2b. In section 2c, a temporary variable (S) receives a stored code $M_i$ and a temporary index (k) receives the value of index i.

Stepping to the next line is performed at Section 2d. If no more lines are available for testing, an error flag is set at Section 2e, and a command for an indication of error is sent to interface 4, e.g. by an alarm subroutine (not described). At Section 2f, a transfer to code comparison logic 106 (described below) is initiated.

In Section 3, operator selected operations (PLAY, ADVANCE, RETURN or DELETE) are completed relative to the addressed point in the text string if a matching text segment has been found.

LOGIC TABLE 5

| | Do "TO" Mode Search |
|---|---|
| Sec 1 | set t = i (number of characters keyed in "To" mode) |
| | set ERROR FLAG = 0 |
| | set "TO" FLAG = 0 |
| | set MATCH FAIL FLAG = 1 |
| Sec 2 | WHILE ERROR FLAG = 0 AND MATCH FAIL FLAG = 1 |
| | DO |
| Sec 2a | IF $C_1$ = return code |
| | THEN set i = p − 1 |
| | set j = −1 |
| Sec 2b | ELSE set i = r |
| | set j = +1 |
| | ENDIF |
| Sec 2c | set S = $M_i$ |
| | set k = i |
| Sec 2d | WHILE S $\neq$ separator AND S $\neq$ carrier return code, required carrier return code, indent clear code, or index code |
| | DO |
| | IF S = (one of multiple byte codes) |
| | THEN set i = i + j* (length of code − 1) |
| | ENDIF |
| | set S = $M_i$ |
| | set i = i + j |
| | ENDWHILE |
| Sec 2e | IF i = k |
| | THEN set ERROR FLAG = 1 and CALL (alarm) |
| Sec 2f | ELSE i = i + 1 |
| | set q = i |
| | CALL (See If There is a Match) |
| | ENDIF |
| | ENDWHILE |
| Sec 3 | IF MATCH FAIL FLAG = 0 |
| | THEN IF $C_1$ = Play code |
| | THEN CALL (Do a Play Operation) |
| | ELSE IF $C_1$ = Advance or Return Code |
| | THEN CALL (Do an Advance/Return Operation) |
| | ELSE IF $C_1$ = DELETE CODE |
| | THEN CALL (Do a Delete Operation) |
| | ENDIF |
| | ENDIF |
| | ENDIF |
| | ENDIF |
| | RETURN |

Referring to Logic Table 6, logic 106 for testing codes for a match to the stored address $T_i$ initializes, at Section 1, flags for indicating the success state of the matching operation. Sections 2-2g comprise a loop that successively tests codes in a line for a match to the address codes stored in variable $T_k$. Section 2a recognizes space codes in the address string and, in effect, equates them to a single space code for comparison purposes. A temporary variable S receives a code from the stored text string $M_i$ at Section 2b and at Section 2c a syllable hyphen code or coded hyphen code is converted (in effect equated) for comparison purposes to a regular hyphen code. Codes occurring in the text string that correspond to a shift in print point without printing are equated, in effect, to a single space code for comparison purposes by the logic of Section 2d.

At Section 2e, codes that represent line or text ending positions are detected and set a flag variable indicating a match failure. Codes that do not represent graphic or print point positioning codes are skipped over at Section 2f. If the address and stored codes are not the same, the logic of Section 2g determines whether the codes being tested correspond to a character that is represented by two different codes, e.g. the period and the comma which print the same for upper and lower case. Such codes are equated for comparison purposes and in the preferred embodiment advantage is taken of the fact that one particular code bit has been reserved to distinguish upper case from lower case. If, after equating such characters that are represented by more than one code, the compare still fails, a flag variable (MATCH FAIL FLAG) indicating that fact is set. At Section 2h, a check is made to assure that at least one graphic was a part of the comparison.

LOGIC TABLE 6

| | See If There is a Match |
|---|---|
| Sec 1 | set GRAPHIC FOUND FLAG = 0 |
| | set MATCH FAIL FLAG = 0 |
| | set k = 1 |
| Sec 2 | WHILE k ≦ t AND MATCH FAIL FLAG = 0 |
| | DO |
| | set U = $T_k$ |
| Sec 2a | IF U = space |
| | THEN CALL (Position Keyed Characters Beyond Space) |
| | ELSE set the GRAPHIC FOUND flag = 1 |
| | ENDIF |
| | REPEAT |
| Sec 2b | set k = k + 1 |
| | set S = $M_i$ |
| Sec 2c | IF S = syllable hyphen code or coded hyphen code |
| | THEN set S = regular hyphen code |
| Sec 2d | ELSE IF S = space code, coded space code, tab code, or indent code |
| | THEN CALL (Position Memory Beyond Space) |
| | set S = space code |
| | ENDIF |
| | ENDIF |
| | set i = i + 1 |
| Sec 2e | IF S = separator code, carrier return code, required carrier return code, indent clear code, or index code |
| | THEN set MATCH FAIL FLAG = 1 |
| Sec 2f | ELSE IF S = space code or graphic code |
| | THEN IF S $\neq$ U |
| Sec 2g | THEN IF S is an upper case period code or lower case period code or upper case comma code or lower case comma code |
| | THEN IF S $\neq$ U without using shift bit in compare |
| | THEN set MATCH FAIL FLAG = 1 |
| | ENDIF |
| | ELSE set MATCH FAIL FLAG = 1 |
| | ENDIF |
| | ENDIF |
| | ENDIF |
| | ENDIF |
| | UNTIL S = graphic code or space code OR MATCH FAIL FLAG = 1 |
| | ENDREPEAT |
| | ENDWHILE |
| Sec 2h | IF GRAPHIC FOUND FLAG = 0 |
| | THEN set MATCH FAIL FLAG = 1 |
| | ENDIF |
| | RETURN |

Logic 107 for skipping over multiple space codes in a text address is invoked by the text matching logic 106 of Logic Table 6. Such logic 107 is described in Logic Table 7 and basically involves an advancing of the address index. Logic 108 that examines the text string and equates print position shifting codes and also any adjacent shifting codes to a single space code is described in Logic Table 8. Again, an index incrementing operation advances the compare past these codes and the temporary variable S in Logic Table 6 is set to be the space code.

LOGIC TABLE 7

Position Keyed Characters Beyond Space

```
WHILE T_{k+1} = space code AND k ≠ 1
DO
  set k = k + 1
ENDWHILE
RETURN
```

LOGIC TABLE 8

Position Memory Beyond Space

```
WHILE M_{i+1} = space code, coded space code, tab
  code (F0 or F1) or indent code (F2 or F3)
DO
  set i = i + 1
ENDWHILE
RETURN
```

Referring to Logic Table 9, the logic 109 for printing from storage is described. Section 1 indicates generally a test for termination which, for the preferred implementation, may be a word ending code or a line ending code or a line found by a search (TO MODE) or at the operator's choice by selecting a key in conjunction with the PLAY key. Also, a second depression of the PLAY key is preferably treated as a command to stop. A loop (Sections 1-7) is initiated and a flag (the KEYED FLAG) is set to indicate codes are originating from storage and not the keyboard. A test is made at the start of Section 2 to determine whether the operator has selected the ADJUST mode (which action sets the ADJUST FLAG to 1) indicating that line ending will be automatically adjusted rather than printed as originally keyboarded. Syllable hyphens and discretionary carrier returns are deleted from the text string if they occur at a printer position (PPOS) to the left of the beginning of the return zone (here assumed as the right margin—5 character position increments) and a carrier return will not be inserted after a syllable hyphen that precedes the beginning of the return zone. At Section 2b, a space code which is followed by a graphic code triggers a transfer to logic 110 for scanning a word for inserting a carrier return (described below). The purpose of the logical testing of Section 2b is to locate a word beginning point and additional testing may be required if control codes, for example, can occur between a space and a graphic in circumstances where treatment as a word beginning is desired.

If the location for inserting a carrier return (stored in the variable INSERT CR LOCATION) is the present printing position (PPOS) then a carrier return is inserted at Section 3 using the PROCESS A CARRIER RETURN logic 102 described above with reference to Logic Table 2. At Section 4, the next code of the string is accessed.

Multisection tab codes are processed in Section 5 and eliminate any need to reference the present tab settings. The tab destination is determined by moving two additional storage locations ($M_{R+2}$) toward the trailing end to access the stored value for tab destination. The index i is then loaded with the number of storage locations that must be skipped for either a special multisection tab code or a special indent tab code. In Section 6, the pointer indexes for the reference locations in storage are incremented by the index i. Then with all of the above preparatory operations completed, a transfer is initiated in Section 7 to the process a character logic 101 described with reference to Logic Table 1.

LOGIC TABLE 9

| | Do a Play Operation |
|---|---|
| Sec 1 | While a termination code is not detected |
| Sec 1a | DO |
| . | (Note: the next character to be played is $M_r$) |
| . | set KEYED FLAG = 0 |
| Sec 2 | IF ADJUST FLAG = 1 |
| Sec 2a | THEN IF ($M_r$ is a syllable hyphen code or discretionary carrier return code) AND (PPOS < RT margin − 5) AND ($M_r$ = SYLLABLE HYPHEN CODE AND INSERT CR LOCATION ≠ PPOS) |
| . | THEN delete the syllable hyphen or discretionary CR |
| Sec 2b | ELSE IF $M_r$ = graphic code and $M_p$ = space code |
| . | THEN CALL (Scan the Word for Inserting a Carrier Return) |
| . | ENDIF |
| . | ENDIF |
| . | ENDIF |
| Sec 3 | IF INSERT CR LOCATION = PPOS |
| . | THEN set the |
| . | INSERTED CARRIER RETURN FLAG = 1 |
| . | set $C_1$ = CR code |
| . | CALL (Process a Carrier Return/Indent Clear) |
| . | ENDIF |
| Sec 4 | set i = 1 |
| . | set $C_1$ = $M_r$ |
| Sec 5 | IF $C_1$ = tab or indent tab (If $C_1$ = $F0_{16}$ or $F1_{16}$ or $F2_{16}$ or $F3_{16}$) |
| . | THEN set TAB DESTINATION = $M_{r+2}$ |
| . | set i = 4 |
| . | IF $C_1$ = indent tab (F2 or F3) |
| . | THEN set i = 5 |
| . | ENDIF |
| . | ENDIF |
| Sec 6 | set p = p + i |
| . | set r = r + i |
| Sec 7 | CALL (Process a Character) |
| . | ENDWHILE |
| . | RETURN |

Referring to Logic Table 10, logic 110 for adjusting text by checking the effect of individual words on line appearance is described. In Section 1, various flag variables are set that bear information indicated by their names. The end of the preceding word is stored in variable E2 in Section 2 including the effect of an inserted carrier return. A set of hyphen location indicators are initialized in Section 3 as is indexing variable i. The word end portion for the next word is calculated in the loop defined at Sections 4-4a with control codes being treated specially in the nested loop defined within Section 4a. Section 5 serves to include word ending dashes in the word. At Section 6, stop logic is provided for a hyphenate mode if selected by the operator and operator intervention is required to continue PLAY operation.

LOGIC TABLE 10

| | Scan the Word for Inserting a Carrier Return |
|---|---|
| Sec 1 | set the HYPHEN LEFT OF ZONE FLAG = 0 |
| . | DISCRETIONARY CR SCANNED FLAG = 0 |
| . | NON-HYPHEN GRAPHIC IN WORD FLAG = 0 |
| . | LAST CHARACTER WAS HYPHEN FLAG = 0 |
| . | SYLLABLE HYPHEN LEFT OF ZONE FLAG = 0 |
| . | HYPHENATED WORD FLAG = 0 |
| . | HYPHENATION LOCATION FLAG = 0 |
| Sec 2 | IF INSERTED CR LOCATION ≠ PPOS |
| . | THEN set E2 = PPOS |
| . | ELSE set E2 = LEFT MARGIN |
| . | ENDIF |

LOGIC TABLE 10-continued

Scan the Word for Inserting a Carrier Return

| | |
|---|---|
| Sec 3 | set PREZONE HYPHEN and |
| | POSTZONE HYPHEN = −1 |
| . | set i = r |
| Sec 4 | REPEAT |
| . | CALL (Compute the Character's Escapement) |
| Sec 4a | REPEAT |
| . | set i = i + 1 |
| . | UNTIL $M_i \neq$ Stop Code or continuous underscore code or index code or a discretionary carrier return played before zone or a carrier return followed by a carrier return |
| . | ENDREPEAT |
| . | UNTIL (the HYPHENATION LOCATION FLAG = 1 AND |
| . | $M_{i+1} \neq$ hyphen) OR |
| . | $M_i$ is not a graphic code, or a backspace code followed by a graphic ($M_{i+1}$ = graphic code) |
| . | ENDREPEAT |
| Sec 5 | IF $M_i$ = space |
| . | THEN add to E2 the escapement for any word ending dashes |
| . | ENDIF |
| Sec 6 | IF E2 is beyond the right margin AND the NONHYPHEN GRAPHIC IN WORD FLAG = 1 |
| . | THEN IF HYPHENATE MODE IS SELECTED |
| . | THEN stop for hyphenation |
| . | ELSE CALL (See Where to Insert a Carrier Return) |
| . | ENDIF |
| . | ENDIF |
| . | RETURN |

Referring to Logic Table 11, logic 111 is described for computing a character escapement. At Section 1, flag variables are set for indicating that a hyphen or certain control codes have not been encountered as the only characters in the word. In Section 2, flag variables (having names descriptive of purpose) are set to indicate the occurrence of a hyphen code in a word and the location of the hyphen relative to the right margin. In Section 3, the escapement for the accessed code is added to the total E2 which, when accumulation is complete, indicates the end of the next word. The escapement value is accessed from ROS 14 (FIG. 1) in a table reference to the text codes. If the code represents a syllable hyphen, no addition to the total occurs unless, based on the location for inserting a carrier return, the hyphen would be printed. In Section 4, the reverse escapement effect of a backspace operation is included in the WORD END total.

LOGIC TABLE 11

Compute the Character's Escapement

| | |
|---|---|
| Sec 1 | $M_i \neq$ hyphen, continuous underscore, word underscore, index, or coded space codes |
| | THEN set the NONHYPHEN GRAPHIC IN WORD FLAG = 1 |
| | IF the HYPHEN LEFT OF ZONE FLAG = 1 |
| | THEN set PREZONE HYPHEN = E2 |
| | ENDIF |
| | ENDIF |
| | set HYPHEN LEFT OF ZONE FLAG = 0 and LAST CHARACTER WAS HYPHEN FLAG = 0 |
| Sec 2 | IF $M_i$ is a graphic code |
| Sec 2a | THEN IF $M_i$ is a hyphen code or syllable hyphen code and $M_{i-1} \neq$ space code |
| Sec 2b | THEN set the LAST CHARACTER WAS HYPHEN FLAG = 1 |
| Sec 2c | IF E2 < RT MARGIN − 5 |
| . | THEN set the HYPHEN LEFT OF ZONE FLAG = 1 |
| Sec 2d | ELSE IF RT MARGIN − 5 ≦ E2 < RT MARGIN |
| . | THEN set the HYPHENATION LOCATION FLAG = 1 |
| Sec 2e | ELSE IF POSTZONE HYPHEN = −1 or |

LOGIC TABLE 11-continued

Compute the Character's Escapement

| | |
|---|---|
| . | POSTZONE HYPHEN = E2 − 1 |
| Sec 2f | THEN set POSTZONE HYPHEN = E2 |
| . | ENDIF |
| . | ENDIF |
| . | ENDIF |
| . | ENDIF |
| Sec 3 | IF $M_i \neq$ syllable hyphen code OR the HYPHEN LEFT OF ZONE FLAG = 0 |
| . | THEN set E2 = E2 + the escapement for this character (stored in a table in ROS 14) |
| . | ENDIF |
| Sec 4 | ELSE IF $M_i$ = backspace code |
| . | THEN set E2 = E2 − 1 |
| . | ENDIF |
| . | ENDIF |
| . | RETURN |

Referring to Logic Table 12, a set of zone boundaries (Z12, Z23, Z34, Z45 and Z56) for line adjustment are first established in Section 1 of the logic 112, and are related to the right margin. One of the boundaries (represented as the variable PAPER EDGE) is a predefined position count number that corresponds to the usual location of the paper edge. A variable $E_3$ has been established (Logic Table 2) with the stored value of the printer position for the ending of the last line. And variable $E_1$ contains (see Logic Table 1) the end position for the last word printed. $E_2$ is the variable that contains the location code for the end of the next word to be printed. In Section 2, a variable POST ZONE HYPHEN is set to indicate the end of the next word if a hyphen can be used as a word break point. Also, the line ending logic 112 is not needed if there will be hyphen in the return zone or this is the first word of a line which is caused to be printed irrespective of end point. The variables $E_1$, $E_2$ and $E_3$ are compared to the zone boundaries in Section 3 which defines logical tests for deciding whether or not to insert a carrier return.

In Section 4, a carrier return is inserted based on the above-discussed tests at the end of the last word printed, a check being made to account for a hyphen in the next word that would print before the return zone. If the test determine that a carrier return is not to be inserted before the next word, then the variable INSERT CR LOCATION is loaded with the end of the next word in Section 5.

LOGIC TABLE 12

See where to Insert a carrier return

| | |
|---|---|
| Sec 1 | set Z23 = RT margin − 5 |
| . | set Z34 = RT MARGIN |
| . | set Z12 = Z23 − 5 |
| . | set Z45 = Z34 + 5 |
| . | set Z56 = Z45 + 6 |
| . | (Note E3 = position on previous line where the last graphic was printed) |
| . | (Note E1 = position on current line where the last graphic was printed) |
| . | reset the LEFT SIDE and RIGHT SIDE FLAG to 0 |
| Sec 2 | IF POSTZONE HYPHEN ≠ −1 |
| . | THEN set E2 = POSTZONE HYPHEN |
| . | ENDIF |
| . | IF the HYPENATION LOCATION FLAG = 0 (a hyphen is not in the return zone) AND E1 ≠ 0 (this is not the first word to be printed on this line) |
| Sec 3 | THEN IF E2 > Z45 |
| . | THEN IF E2 > Z56 |
| . | THEN set the LEFT SIDE FLAG = 1 |
| . | ELSE IF E1 < Z12 |

LOGIC TABLE 12-continued

| | See where to Insert a carrier return |
|---|---|
| . | THEN set the RIGHT SIDE FLAG |
| . | ELSE set the LEFT SIDE FLAG |
| . | ENDIF |
| . | ENDIF |
| . | ELSE IF E3 < Z12 OR E3 > Z45 OR (Z23 < E3 ≦ Z34) |
| . | THEN IF E1 > Z12 |
| . | THEN IF Z23 − E1 < E2 − Z34 |
| . | THEN set the LEFT SIDE FLAG |
| . | ELSE set the RIGHT SIDE FLAG |
| . | ENDIF |
| . | ELSE set the RIGHT SIDE FLAG |
| . | ENDIF |
| . | ELSE IF E3 < Z23 AND E1 < Z23 |
| . | THEN set the LEFT SIDE FLAG |
| . | ELSE set the RIGHT SIDE FLAG |
| . | ENDIF |
| . | ENDIF |
| . | ENDIF |
| Sec 4 | IF the LEFT SIDE FLAG is set |
| . | THEN IF PREZONE HYPHEN = −1 |
| . | THEN set INSERT CR LOCATION = E1 |
| . | ELSE set INSERT CR LOCATION = PREZONE HYPHEN |
| . | ENDIF |
| Sec 5 | ELSE set INSERT CR LOCATION = E2 |
| . | ENDIF |
| . | ENDIF |
| . | RETURN |

Referring to Logic Table 13, logic 113 for erasing a code from text storage is described. At Section 1, separator codes are detected and, for such codes, no erase action is taken. Multisection codes are detected at Section 2 to permit special processing of such codes. If a multisection code is not an indent tab or indent clear, it is a tab code (F0 or F1) and can be erased. At Section 2b, the tab shift distance and tab destination sections of a destination tab code are decremented by one unit for each erase operation. When the shift distance is decremented to zero, as determined as Section 2c, the leading reference address in storage is shifted so that the multisection tab code is in the empty storage gap (effectively erased). A shift command is sent to the printer at Section 2d. For codes other than the special multisection codes, the conventional erase techniques are used, e.g. if automatic erase is provided, the print point is shifted, the erase ribbon (not shown) is shifted to position and the unwanted character is caused to be represented. Since such operation is known and does not bear a close relationship to the invention, a detailed description will not be provided.

LOGIC TABLE 13

| | Erase |
|---|---|
| Sec 1 | IF $M_p \neq$ separator code |
| Sec 2 | THEN IF $M_p$ = multisection code (Fx) |
| Sec 2a | THEN IF $M_p \neq$ indent tab (F2, F3) or indent clear (F6) |
| . | THEN |
| Sec 2b | set $M_{p-2} = M_{p-2} - 1$ (space counts) |
| . | set $M_{p-1} = M_{p-1} - 1$ |
| Sec 2c | IF $M_{p-2} = 0$ |
| . | THEN set p = p−4 |
| . | ENDIF |
| Sec 2d | Move the printer 1 space backward by sending distance and direction data to decoder 52 of interface 4 (FIG. 3) |
| . | ENDIF |
| Sec 3 | ELSE erase the character (e.g. set p = p − 1) and send erase signals to interface 4 |
| . | ENDIF |

LOGIC TABLE 13-continued

| | Erase |
|---|---|
| . | ENDIF |

The logic 114 for the text store operations interacts with the other logic and is triggered, for example, using a STORE FLAG which is toggled between the zero and one states in response to the code indicating the STORE key has been depressed (see Logic Table 14). Additional sophistication may be provided to permit storage of individually retrievable documents as is known in the art.

LOGIC TABLE 14

| Store |
|---|
| IF $C_1$ = Store Code |
| THEN invert STORE FLAG |
| ENDIF |
| RETURN |

For logic 115 used in the delete mode of operation (see FIG. 7, Block 230), according to a presently preferred implementation, the codes to be deleted from a text string are caused by a shift in reference point location r to come within the gap of "empty storage" so as to be effectively deleted from the text string (see Logic Table 15). If a word or line mode has been selected, the destination memory position must be determined by searching for a word or line ending, respectively, as is known in the art.

LOGIC TABLE 15

| Delete |
|---|
| IF "TO" FLAG = 1 |
| THEN q is the final memory position for the delete |
| ELSE find q (e.g. line, word) based on type of location |
| ENDIF |
| set r = q |
| RETURN |

The logic 116 for advance and return operations is described in Logic Table 16. At Section 1, it is determined if the reference point destination has already been identified by a content-addressed ("TO" mode) search. If not, the destination is determined according to the selected mode (e.g. line, word) by scanning for a corresponding ending code as is known in the art.

In Section 2, a direction indicator i is established to indicate the direction of reference point movement is toward the leading end (return) or trailing end (advance) of text storage. The shifting of the reference point is effected in a separate block of logic 117 (Logic Table 17) that is entered by a transfer at Section 3. At Section 4, a temporary index j is set to the location p of the leading end (of the empty space gap) reference position and a temporary variable (ESCAPEMENT) for storing print position shifts is initialized to zero. Print position shifts are accumulated in Section 5 for codes toward the leading end of storage until the beginning of the line is located by encountering a code such as a carrier return code. If a destination tab code ($F0_{16}$ or $F1_{16}$) is encountered, the shift distance is extracted from the portion of the multisection code containing such information (the second byte of four) and the index j is reduced to move to the next code. For other codes, the print position shift is determined from a stored table (data stored in ROS 14, FIG. 1) and added to the total.

At Section 6, the total in the variable ESCAPEMENT is referenced to the active left margin and the shift from the present printing position PPOS is sent to the interface 4 to cause a print position shift.

LOGIC TABLE 16

Advance/Return

```
Sec 1   IF "TO" FLAG = 1
          THEN q is the final memory position for the operation
          ELSE find q based on type of operation (e.g.
          line, word)
          ENDIF
Sec 2   IF C = Advance Code
          THEN set i = +1
          ELSE set i = -1
          ENDIF
Sec 3   CALL (Shift Reference to New Position)
Sec 4   set j = p
          set ESCAPEMENT = 0
Sec 5   WHILE $M_j \neq$ separator code, carrier return code,
          required carrier return code, indent
          clear code, or indent tab code
          DO
Sec 5a  IF $M_j$ = destination tab code (F0, F1)
          THEN set ESCAPEMENT = ESCAPEMENT + $M_{j-2}$
          set j = j - 3
          ELSE add stored escapement value corresponding
          to the character to ESCAPEMENT
          ENDIF
          set j = j - 1
          ENDWHILE
Sec 6   set DELTA = ACTIVE LEFT MARGIN +
          ESCAPEMENT - PPOS
          send DELTA positioning data to decoder 52 (FIG. 3)
          RETURN
```

The logic 117 for shifting to a new position in text storage that is entered from the advance/return logic of Logic Table 16 is described in Logic Table 17. A test is performed at Section 1 to determine when the destination location (q) has been reached for either advance or return operation. At Section 2, a temporary index k is initialized to r or p, respective of whether an advance or return operation is being performed.

In Section 3, a temporary variables receives $M_k$. The active left margin is changed in Section 4a in recognition of an advance past an indent tab code. For a positive indent tab (F2) the destination stored at the third section of the multisection indent tab code is added to the active left margin. For a negative destination tab code (F3), the tab destination is subtracted from the active left margin. When a return operation over an indent tab occurs, the active left margin is restored to the value that it had when the indent tab was originally keyed (represented at the second segment (byte) of the indent tab code from the trailing end).

At Section 5, an indent clear code is detected and for advance operation (Section 5a), the active left margin is shifted to coincide with the permanent left margin. If a return operation over an indent clear code is detected, Section 5b sets the active left margin to coincide with the left margin stored in the section of the indent clear code at location k-1.

At Section 6, indexes p and r are adjusted for a shift beyond the present code including the extra shift for the multisection tab codes and indent tab codes.

LOGIC TABLE 17

Shift Reference to New Position

```
Sec 1   WHILE r $\neq$ q AND p - 1 $\neq$ q
          DO
Sec 2   IF i = +1
          THEN set k = r
          ELSE set k = p
```

LOGIC TABLE 17-continued

Shift Reference to New Position

```
          ENDIF
Sec 3   set S = $M_k$
Sec 4   IF S = indent tab code (F2 or F3)
Sec 4a  THEN IF i = +1
          THEN IF S = F2
          THEN set ACTIVE LEFT MARGIN = $M_{k+2}$
          (tab destination) + ACTIVE
          LEFT MARGIN
          ELSE set ACTIVE LEFT MARGIN = ACTIVE
          LEFT MARGIN - $M_{k+2}$
          ENDIF
Sec 4b  ELSE set ACTIVE LEFT MARGIN = $M_{k-1}$ (old
          left margin)
          ENDIF
Sec 5   ELSE IF S = indent clear code (F6)
Sec 5a  THEN IF i = +1
          THEN set ACTIVE LEFT MARGIN =
          PERMANENT LEFT MARGIN
Sec 5b  ELSE set ACTIVE LEFT MARGIN =
          $M_{k-1}$ (previous left margin)
          ENDIF
          ENDIF
          ENDIF
Sec 6   set n = number of sections in code
          (F0, F1 set n = 4
          F2, F3 set n = 5
          F6 set n = 3
          all others set n = 1)
          set p = p + n $\times$ i
          set r = r + n $\times$ i
          ENDWHILE
```

The invention and a presently preferred implementation thereof have been described in detail. It will be appreciated, however, that variations and modifications within the scope of the invention will be suggested to those skilled in the art. For example, various types of printers may be employed in implementing the invention including non-impact printers such as ink jet printers. Also, various logic devices may be employed to implement the invention including discrete device type logic.

Figure 9:
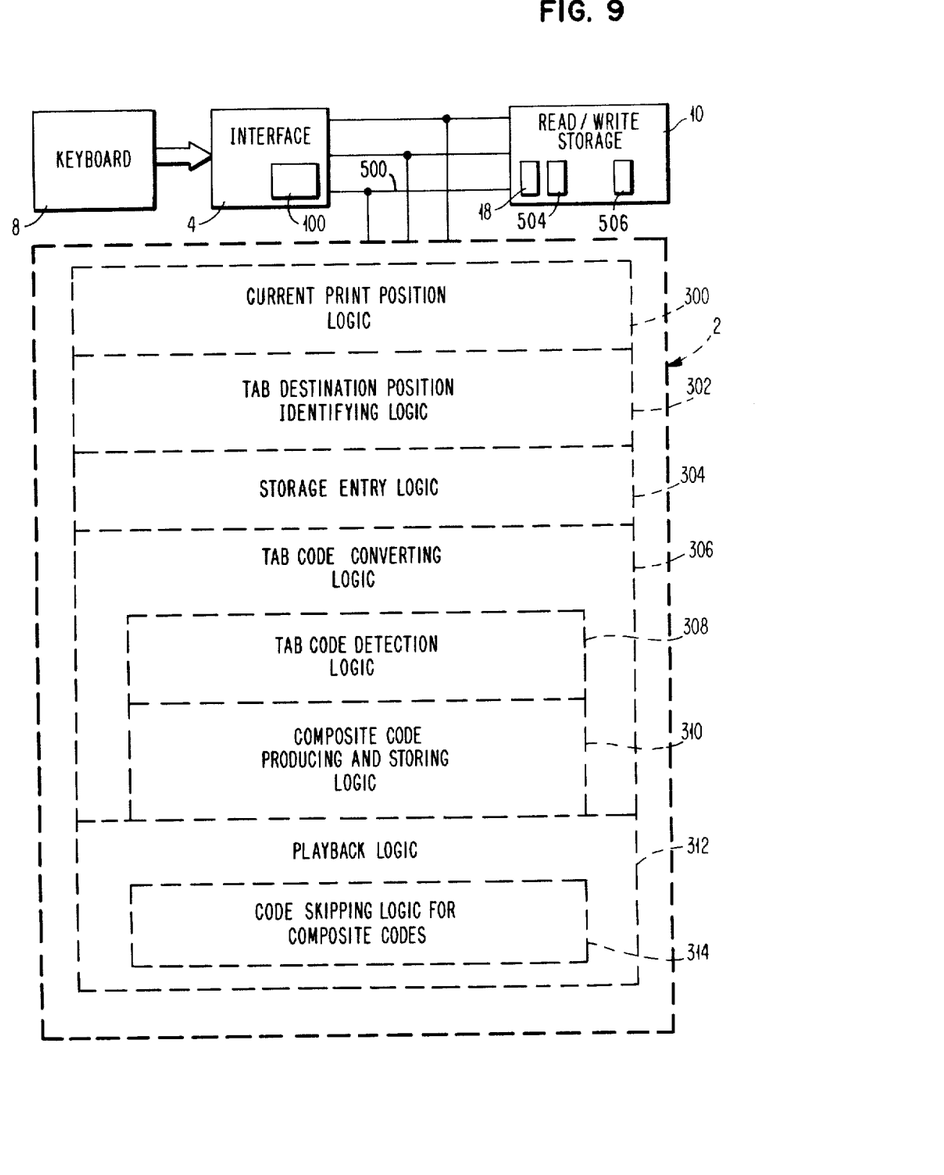
FIG. 9 is a block diagram indicating logic partitioned by functional attributes.

Referring to FIG. 9, the logic device 2 is represented in a partitioned form indicating certain main functions to aid in reference to the Logic Tables 1–17 regarding the invention. A current print position count (PPOS) is maintained (Block 300) as described with reference to FIGS. 3 and 5. The destination positions are identified (Block 302) as described with reference to FIG. 5 and Section 4 of Logic Table 1 storage. Storage entry logic (Block 304) is discussed initially with reference to Block 240 of FIG. 7. Tab converting logic 306 is described in Logic Tables 1 and 3 and includes tab detection logic 308 described at Section 5 of Logic Table 1 and as well as composite code producing and storing logic 310 described at Sections 4, 4a, 4b and 5 of Logic Table 3.

Storage playback logic 312 is described in Logic Tables 9 and 16 and includes code skipping logic 314 for composite codes as described at Section 5 of Logic Table 9 and Section 5a of Logic Table 1b.

What is claimed is:

1. For use in a typewriter that stores text and includes means for identifying printing positions along a line according to position numbers and means for storing a code representative of a present printing position, means for associating position numbers in storage with tab selections, and key means for generating a predefined tab code responsive to an operator actuation, a tab code converter comprising:

logic means, responsive to the tab code for initiating a code conversion;

means, responsive to said initiating means, for producing in a set of storage locations a composite tab code that includes, at one end, a first series of bits in a predefined pattern that includes the composite code is a tab code and a second series of bits in a predefined pattern at the other end of the composite code that indicates the composite coded is a tab code, said code producing means including means for accessing, from a tab storage, the code representative of the destination printing position for an initiated tab operation and for storing such code at a storage location between said first and second series of bits as part of the composite code.

2. For use in a typewriter of the kind that includes means for positioning a print point along a line at positions corresponding to coded position numbers, means for maintaining a stored code indicating the current print point position, sequential storage for strings of text in coded form, means to indicate by a stored code the current text string storage access location, said strings of text being based on actuation of keyboard apparatus that includes means for producing a keyboard tab code to initiate a print point shift from a present printing position to a destination printing position which is defined by a position representative code from a set of stored tab setting codes, and operator-activatable playback means for incrementing said access location in a forward or reverse direction with printer action corresponding to the code stored at the accessed locations, tab code logic apparatus comprising:

means for detecting a keyboard tab code introduced in a text string from said keyboard apparatus;

means, responsive to said keyboard tab code detecting means, for storing a multisection tab code for entry in said text string storage, said storing means including means for identifying said destination position code, means for accessing said entry point code and for writing in said sequential storage, at a location determined therefrom, a series of codes including predefined tab identifier codes that are positioned at respective end locations for the multisection code, said writing means further writing said destination position code between said end locations; and means, responsive to forward operation of said playback causing means, for detecting tab indicator codes accessed from said text string storage and for responsively accessing the position code portion of the corresponding multisection code to initiate a print position shift to the represented location.

3. Tab code logic apparatus according to claim 2 including means for accessing, in response to a keyboard tab code, said stored code indicating the current print position, means for differencing the destination position code and the current print position code to produce a shift distance code, and means for writing that code into a distinct storage location between said multisection code end points.

4. Tab code logic apparatus according to claim 3 wherein means is provided, responsive to playback operation in the reverse direction, for detecting a tab indicator code and for responsively accessing said shift distance code for use in controlling reverse shifting of the current print position.

5. Tab code logic apparatus according to claim 2 wherein said tab identifier codes for respective multisection code ends are the same.

6. Tab code logic apparatus according to claim 2 wherein means is provided to increment the storage pointer to the code beyond the multi-section code in the text string after accessing said destination position code, the increment corresponding to fixed number of locations from the destination code to and including the end code prescribed for the multisection code.

7. Tab code logic apparatus according to claim 3 wherein means is provided for decrementing the shift distance code and the destination position code by one increment for particular individual keyboard apparatus actuations corresponding to erase.

8. For use in a typewriter of the kind that includes means for positioning a print point along a line at positions corresponding to coded position numbers, means for maintaining a stored code indicating the current print point position, sequential storage for strings of text in coded form, means to indicate by a stored code the current text string storage entry location, said strings of text being based on actuation of keyboard apparatus that includes means for producing a keyboard tab indent code to initiate a print point shift from a present printing position to a destination printing position which is defined by a position representative code from a set of stored tab setting codes, means for establishing an active left margin location and storing the location thereof in coded form, and operator-activatable playback means for incrementing said access location in a forward or reverse direction with printer action corresponding to the code stored at the accessed locations, tab code logic apparatus comprising:

means for detecting a keyboard tab indent code introduced in a text string from said keyboard apparatus;

means, responsive to said keyboard tab code detecting means, for converting a multi-section tab code for entry in said text string storage, said converting means including means for identifying said destination position code, means for accessing said entry point code and for writing, at a location determined therefrom, a series of codes including predefined tab identifier codes that are positioned at respective end locations for the multisection code, said writing means further writing said destination position code at a particular storage location between said end locations;

means for accessing said active left margin code and for writing said active left margin code in a distinct location between said multisection code end points; and means, responsive to forward operation of said playback causing means, for detecting tab indicator codes accessed from said text string storage and for responsively accessing the destination position code portion of the corresponding multisection code to initiate a print position shift to the represented location.

* * * * *